United States Patent
Jung et al.

(10) Patent No.: US 9,208,532 B2
(45) Date of Patent: Dec. 8, 2015

(54) WATERMARK PROCESSING DEVICE AND METHOD, AND IMAGE CAPTURING APPARATUS

(71) Applicant: HANWHA TECHWIN CO., LTD., Changwon-Si (KR)

(72) Inventors: Young-Je Jung, Changwon (KR); Eun-Jeong Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/072,972

(22) Filed: Nov. 6, 2013

(65) Prior Publication Data
US 2014/0307915 A1   Oct. 16, 2014

(30) Foreign Application Priority Data

Apr. 10, 2013  (KR) .................. 10-2013-0039513

(51) Int. Cl.
*G06T 1/00* (2006.01)
(52) U.S. Cl.
CPC ............. *G06T 1/0021* (2013.01); *G06T 1/0057* (2013.01); *G06T 2201/0052* (2013.01)
(58) Field of Classification Search
CPC ................................................... G06T 1/0021
See application file for complete search history.

(56) References Cited

U.S. PATENT DOCUMENTS

| | | | |
|---|---|---|---|
| 6,556,689 B1* | 4/2003 | Xia et al. | 382/100 |
| 7,092,545 B2 | 8/2006 | Seo et al. | |
| 7,343,025 B2* | 3/2008 | Seo et al. | 382/100 |
| 2008/0089552 A1* | 4/2008 | Nakamura et al. | 382/100 |
| 2012/0128199 A1 | 5/2012 | Ono et al. | |

FOREIGN PATENT DOCUMENTS

| | | |
|---|---|---|
| JP | 2005-328141 A | 11/2005 |
| KR | 10-2004-0022072 A | 3/2004 |
| KR | 10-2007-0001297 A | 1/2007 |

OTHER PUBLICATIONS

Siva, Parthipan. "Digital Watermarking." Parthipan Siva. Nov. 15, 2010. Accessed Jan. 20, 2015. https://web.archive.org/web/20101115065718/http://www.psiva.ca/Research/DigitalWatermarking/digitalWatermarking.html.*

* cited by examiner

*Primary Examiner* — Utpal Shah
*Assistant Examiner* — Kate R Duffy
(74) *Attorney, Agent, or Firm* — Sughrue Mion, PLLC (57) ABSTRACT

Disclosed are a watermark processing device, a method thereof, and an image capturing apparatus capable of reducing a processing time and a calculation amount while inserting a watermark into an image. The watermark processing method includes creating a watermarked image by inserting a predetermined watermark into a virtual wavelet image; and creating a synthesized image by synthesizing an input image and the watermarked image.

20 Claims, 6 Drawing Sheets

WATERMARK PROCESSING DEVICE AND METHOD, AND IMAGE CAPTURING APPARATUS

CROSS-REFERENCE TO RELATED PATENT APPLICATION

This application claims priority from Korean Patent Application No. 10-2013-0039513, filed on Apr. 10, 2013, in the Korean Intellectual Property Office, the disclosure of which is incorporated herein in its entirety by reference.

BACKGROUND

1. Field

Apparatuses and methods consistent with exemplary embodiments relate to a watermark processing device and method, and an image capturing apparatus capable of reducing a processing time and a calculation amount while inserting a watermark into an image 2. Description of the Related Art Due to rapid development of the Internet, transferring and storing digital data has become easier and faster via a wired/wireless network. However, the digital data is so easily copied and modified that it is difficult to discriminate original data from a duplicate. As illegal duplication and distribution spreads, intellectual property rights have arisen over time as a crucial social issue. In order to address this issue, digital watermarking is being researched and practically applied as a technology to serve a basis to protect intellectual property rights and claim a copyright. In early 1990s, applying watermarking to digital images began to be researched. As the watermarking mainly researched in a spatial domain in the early days is now being applied to a frequency domain, its research domain has been changing. Although frequency domain watermarking is robust to an attack compared to spatial domain watermarking, it is hard to precisely select a watermark insertion position due to frequency characteristics. However, the watermark insertion becomes more efficient once a wavelet domain having both frequency characteristics and spatial characteristics is introduced.

A watermark insertion method using a wavelet transform includes performing a 3-level wavelet transform on an image, inserting a watermark, and then performing an inverse wavelet transform. The inserted watermark may be extracted by performing a wavelet transform on an image having a watermark therein and calculating correlation coefficients from inserted level image information and a reference watermark. A watermark insertion/extraction method is robust even in a poor communication environment and during codec compression. It is difficult to remove the watermark.

In order to implement a typical watermark insertion method by using a wavelet transform, an image is required to be wavelet-transformed and finally inversely wavelet-transformed again. In this case, since a two-level wavelet transform is normally adopted, a calculation amount becomes larger. Even when watermark information to be inserted is a fixed value, it takes a long processing time to perform a wavelet transform and then insert a watermark in a wavelet domain. Especially, since the number of pixels of images obtained by a surveillance camera has recently increased to be in the megapixel range, it is difficult to apply watermark insertion to a low specification surveillance camera due to limitations in a calculation amount and a processing time.

SUMMARY

One or more exemplary embodiments provide watermark processing device, a method thereof, and an image capturing apparatus capable of reducing a processing time and a calculation amount while creating a watermarked image.

According to an aspect of an exemplary embodiment, there is provided a watermark processing method including: creating a watermarked image by inserting a predetermined watermark into a virtual wavelet image; and creating a synthesized image by synthesizing an input image and the watermarked image.

The creating of the watermarked image may include: creating the virtual wavelet image by wavelet-transforming a virtual image through at least one time of wavelet transform; inserting the predetermined watermark into a low frequency sub-band image of the virtual wavelet image; and inversely wavelet-transforming the virtual wavelet image having the predetermined watermark inserted therein to create the watermarked image.

The virtual wavelet image may have at least one zero coefficient value.

The creating of the synthesized image may include creating synthesized images by synthesizing each frame of the input image, which is a moving image, and the watermarked image.

The creating of the watermarked image may be performed each time the predetermined watermark is changed.

The watermark processing method may further include compressing the synthesized image to transmit the compressed synthesized image.

According to an aspect of another exemplary embodiment, there is provided a non-transitory computer readable medium having a program recorded thereon which, when executed by a computer performs the watermarking processing method described above.

According to an aspect of still another exemplary embodiment, there is provided a watermark processing device including: a watermarked image creating unit configured to create a watermarked image by inserting a predetermined watermark into a virtual wavelet image; and a synthesizing unit configured to create a synthesized image by synthesizing an input image and the watermarked image.

The watermarked image creating unit may include: a wavelet transforming unit configured to create a virtual wavelet image by wavelet-transforming a virtual image through at least one time of wavelet transform; an inserting unit configured to insert the predetermined watermark into a low frequency sub-band image of the virtual wavelet image; and an inverse wavelet transforming unit configured to inversely wavelet-transform the virtual wavelet image having the predetermined watermark inserted therein to create the watermarked image.

The virtual wavelet image may have at least one zero coefficient value

The synthesizing unit may synthesize each frame of the input image, which is a moving image, and the predetermined watermarked image.

The watermarked image creating unit may create the watermarked image each time the watermark is changed.

The watermark processing device may further include a compressing unit compressing the synthesized image to transmit the compressed synthesized image.

According to an aspect of still another exemplary embodiment, there is provided an image capturing apparatus including: a capturing unit configured to capture the input image of a subject; the watermark processing device described above; a compressing unit configured to compress the synthesized image; and a transmitting unit configured to transmit the compressed image.

The watermark processing device may include: a watermarked image creating unit creating the watermarked image by inserting the predetermined watermark into the virtual wavelet image; and a synthesizing unit creating the synthesized image by synthesizing the captured image and the watermarked image.

The watermarked image creating unit may include: a wavelet transforming unit configured to create a virtual wavelet image by wavelet-transforming a virtual image through at least one time of wavelet transform; an inserting unit configured to insert the predetermined watermark into a low frequency sub-band image of the virtual wavelet image; and an inverse wavelet transforming unit configured to inversely wavelet-transform the virtual wavelet image having the predetermined watermark inserted therein to create the watermarked image.

The virtual wavelet image may have at least one zero coefficient value.

The watermark processing unit may synthesize each frame of the input image, which is a moving image, captured by the capturing unit and the predetermined watermarked image.

The watermark processing unit may create the watermarked image each time the watermark is changed.

BRIEF DESCRIPTION OF THE DRAWINGS

The above and other aspects will become more apparent by describing in detail exemplary embodiments with reference to the attached drawings, in which.

DETAILED DESCRIPTION

The following description with reference to the accompanying drawings is provided to assist in a comprehensive understanding of exemplary embodiments of the inventive concept as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the inventive concept. In addition, descriptions of well-known functions and constructions may be omitted for clarity and conciseness.

Also, though terms like a first and a second are used to describe various elements and/or portions in various embodiments, the members and/or portions are not limited to these terms. These terms are used only to differentiate one member or portion from another one.

The terms and words used in the following description and claims are not limited to the bibliographical meanings, but, are merely used by the inventor to enable a clear and consistent understanding of the inventive concept. Accordingly, it should be apparent to those skilled in the art that the following description of exemplary embodiments are provided for illustration purpose only and not for the purpose of limiting the inventive concept as defined by the appended claims and their equivalents. It is to be understood that the singular forms "a," "an," and "the" include plural referents unless the context clearly dictates otherwise. In the present disclosure, it should be understood that the terms, such as 'include' or 'have,' etc., are intended to indicate the existence of the features, numbers, steps, actions, components, parts, or combinations thereof disclosed in the present disclosure, and are not intended to preclude the possibility that one or more other features, numbers, steps, actions, components, parts, or combinations thereof may exist or may be added.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of related techniques for electronic configuration, signal processing, control, data processing, and the like. The words "mechanism" and "element" are used broadly and are not limited to mechanical or physical embodiments, but can include software routines in conjunction with processors, etc.

Reference will now be made in detail to exemplary embodiments, examples of which are illustrated in the accompanying drawings, wherein like reference numerals refer to the like elements throughout.

Top priority matter to be considered in watermarking is that watermarked information is required not to be removed and but to be extracted in a robust environment. The watermarked information nearly disappears in cases where a watermark is directly inserted into a moving image, a moving image is distorted or an external noise occurs, or the moving image is compressed. However, when a moving image is wavelet-transformed and a watermark is inserted into a low frequency sub-band of the wavelet-transformed moving image, the watermarked information does not disappear; the watermarked information remains even when the moving image is distorted or an external noise occurs, or when the moving image is compressed. This is because the low frequency sub-band includes first compressed information during compression of a wavelet-transformed image. When a watermark is inserted into this low frequency sub-band, the watermarked information does not disappear, despite compression. Especially, if a watermark is inserted into a low frequency sub-band, an amount of the watermarked information gets smaller as the wavelet transform level becomes higher. However, the watermarked information does not disappear, even though a compression rate becomes higher.

In order to insert a watermark, an input image is required to be wavelet-transformed at K levels, where K is equal to or greater than one. In particular, when the input image is a moving image, each frame of the moving image is wavelet-transformed, so that a huge amount of calculation is required. However, it is impossible to wavelet-transform each frame of a megapixel moving image in an image capturing apparatus including a processor of a low processing speed such as a surveillance camera or a digital camera. Accordingly, according to a present exemplary embodiment, a processing time and a calculation amount can be reduced by creating a virtual image having a watermark inserted therein and synthesizing the virtual image and the input image to allow a watermark to be inserted without performing a wavelet-transform on each frame of an input image.

Figure 1:
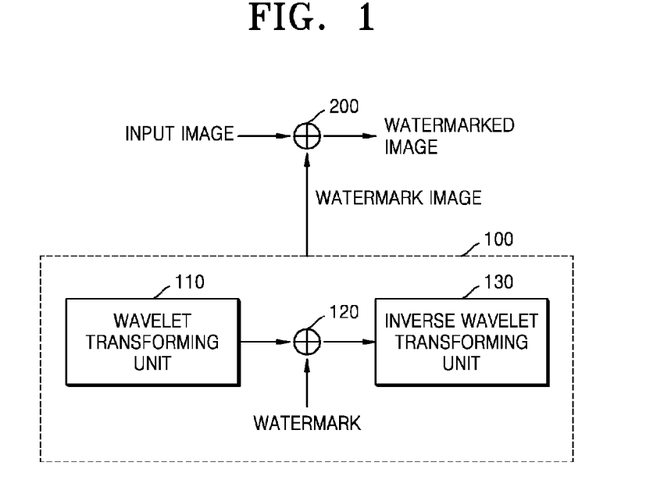
FIG. 1 illustrates a configuration of a watermark processing device according to an exemplary embodiment.

FIG. 1 is a block diagram illustrating a configuration of a watermark processing device according to an exemplary embodiment.

Referring to FIG. 1, the watermark processing device may include a watermarked image creating unit 110 and a synthesizing unit 200.

The watermarked image creating unit 100 creates a watermarked image having a watermark inserted therein. The watermarked image creating unit 100 according to the present embodiment may include a wavelet transforming unit 110, an inserting unit 120 and an inverse wavelet transforming unit 130.

The wavelet transforming unit 110 wavelet-transforms an arbitrary virtual image through predetermined wavelet-transforming levels and creates a virtual wavelet image. Here, the arbitrary virtual image is different from an input image which is captured by an image obtaining unit (not shown in FIG. 1) such as a surveillance camera and input to the watermark processing device. The wavelet transforming unit 110 applies filters to the virtual image to create sub images. That is, the wavelet transforming unit 110 applies a low pass filter and a high pass filter to each row of the virtual image, and performs down-sampling to create a low-low (LL) image as a low frequency sub-band image, and low-high (LH), high-low (HL), and high-high (HH) images as high frequency sub-band images.

Here, the low frequency sub-band (LL) image is created by applying a low pass filter to the virtual image in horizontal and vertical directions and sub-sampling by two. An HL image from among the high frequency sub-band images is created by applying a high pass filter to the virtual image in a vertical direction, and includes an error component of a vertical-direction frequency. An LH image from among the high frequency sub-band images is created by applying a high pass filter to the virtual image in a horizontal direction, and includes an error component of a horizontal-direction frequency. An HH image from among the high frequency sub-band images is created by applying a high pass filter to the virtual image in horizontal and vertical directions.

Figure 2:
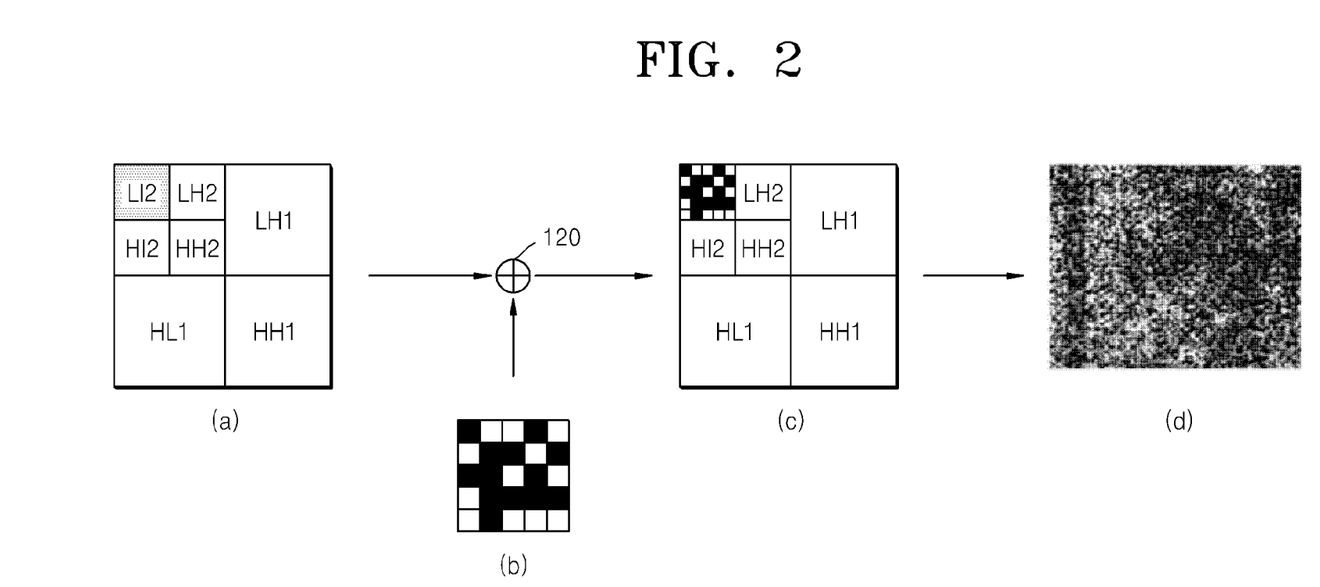
FIG. 2 illustrates a watermarked image creating process in FIG. 1, according to an exemplary embodiment.

The wavelet transforming unit 110 performs the K-level wavelet transform or K times of wavelet transform, for example, a 1-, 2- or 3-level wavelet transform, to create the virtual wavelet image. Here, all of the low frequency sub-band and the high frequency sub-bands have zero coefficient values. The wavelet transforming unit 110 allows for a discrete wavelet transform (DWT). During the K-level wavelet transform, the low-frequency sub-band of each level has more of a DC component of an image, as the level becomes higher. FIG. 2 illustrates watermarked image creation. A virtual wavelet image in FIG. 2(a) is created by performing 2-level wavelet transform. However, the inventive concept is not limited thereto, and a three or more level wavelet transform may be also allowed.

The inserting unit 120 inserts an arbitrary watermark into a low frequency sub-band of the virtual wavelet image. Here, the watermark may be a unique logo (image data) or a data combination (binary data) capable of proving a copyright of a content owner. The binary data type watermark is shown in FIG. 2(b). The watermark is not limited thereto, and may be represented as image data. An insertion result of a watermark into a low frequency sub-band of a virtual wavelet image is shown in FIG. 2(c). The reason for inserting a watermark into a low frequency sub-band of a virtual wavelet image is that watermark information in the low frequency sub-band is not damaged during compression of an image.

The inverse wavelet transforming unit 130 inversely wavelet-transforms a virtual wavelet image having a watermark inserted therein and creates a watermarked image. The inverse wavelet transforming unit 130 creates the watermarked image by combining a low frequency sub-band image having a watermark inserted therein and high frequency sub-band images. FIG. 2(d) shows a watermarked image created by inversely wavelet-transforming a virtual wavelet image having a watermark inserted therein.

Figure 3:
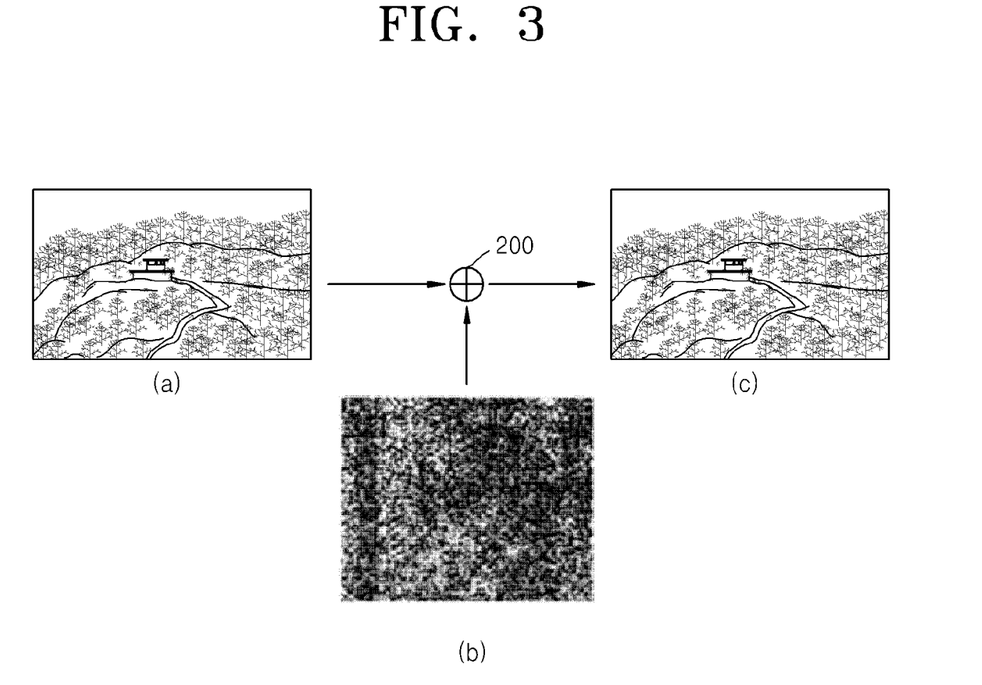
FIG. 3 illustrates a watermarked input image creating process in FIG. 1, according to an exemplary embodiment.

The synthesizing unit 200 creates a synthesized image in which an input image is combined or synthesized with the watermarked image shown in FIG. 2(d). Here, the synthesized image indicates a watermarked input image. The input image may be a still image or a moving image. When the input image is a moving image, the synthesizing unit 200 creates synthesized images in which each frame of the moving image is synthesized with the watermarked image shown in FIG. 2(d). FIG. 3 illustrates a synthesized image, namely, creation of a watermarked input image. FIG. 3(a) represents an input image, FIG. 3(b) represents a watermarked image, and FIG. 3(c) represents a synthesized image, namely, a watermarked input image. As described above, since a watermarked image and an input image are synthesized, it is not necessary to wavelet-transform an input image. In addition, since a watermarked image creating unit 100 re-operates to create a watermarked image only when a watermark is changed, a processing time and a calculation amount can be reduced. Thereafter, the synthesized image may be compressed to be transmitted outside.

Figure 4:
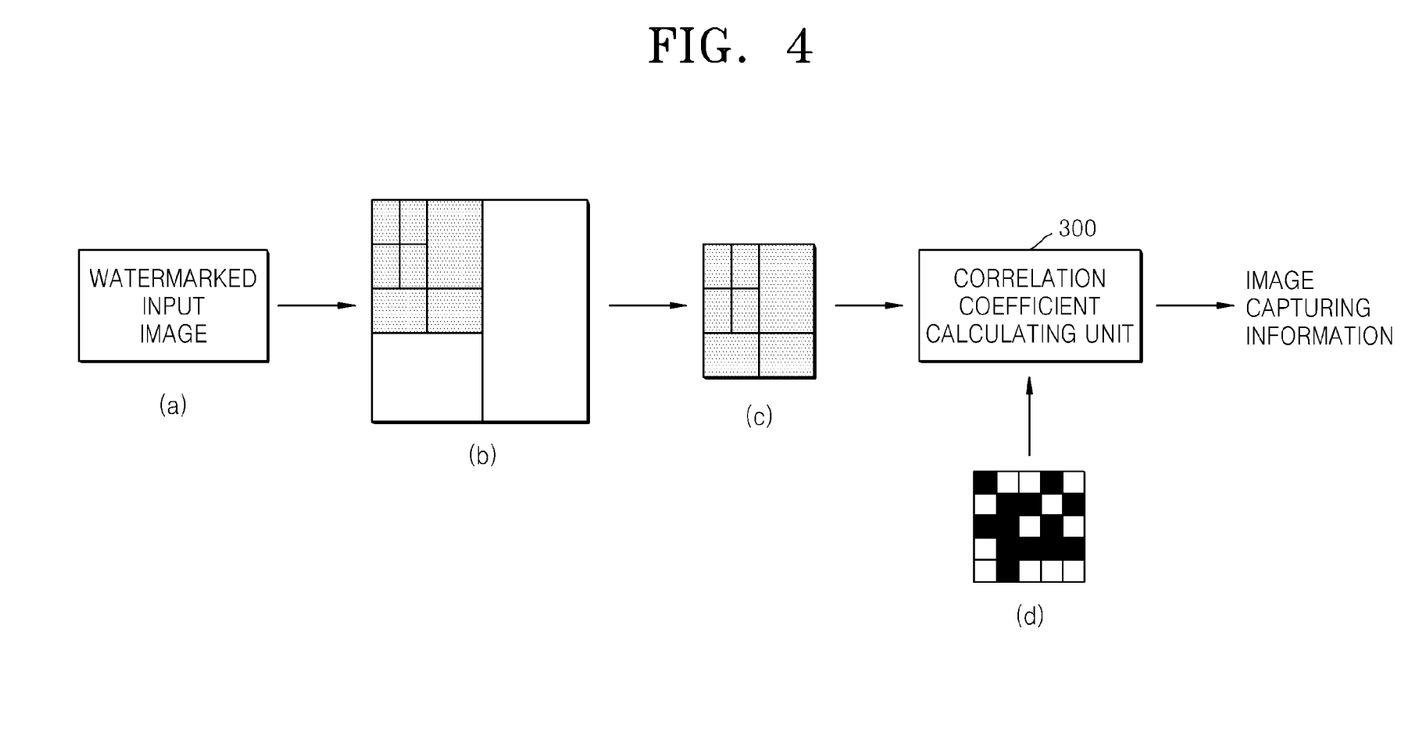
FIG. 4 illustrates a watermark extraction in an image receiving stage, according to an exemplary embodiment.

FIG. 4 illustrates extraction of a watermark at an image receiving stage. Referring to FIG. 4, FIG. 4(a) represents a received synthesized image, namely, the watermarked input image. FIG. 4(b) represents a result of wavelet-transforming the watermarked input image in 2-level. FIG. 4(c) represents a low frequency sub-band image extracted from the wavelet-transformed image. FIG. 4(d) represents an original watermark stored in an image receiving stage. A correlation coefficient calculating unit 300 calculates correlation coefficients of the low frequency sub-band image and the original watermark, and outputs image capturing information from results of the correlation coefficient calculation.

Figure 5:
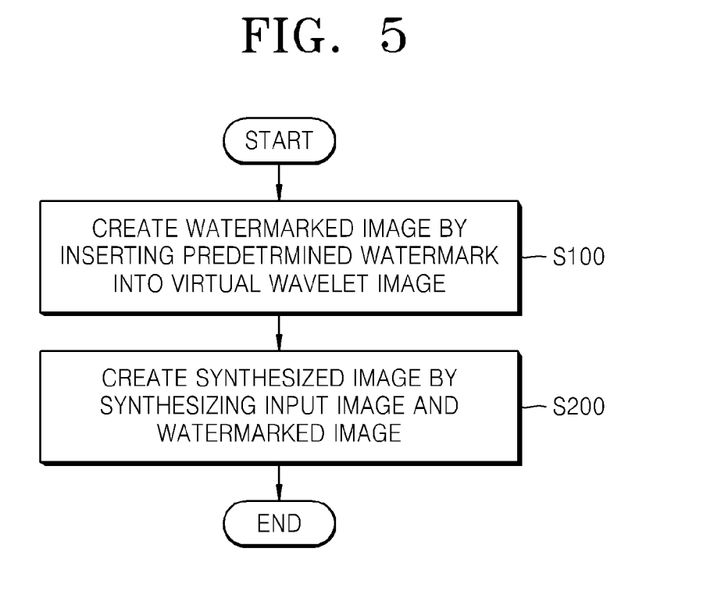
FIG. 5 is a flowchart illustrating a watermark processing method according to an exemplary embodiment.

FIG. 5 is a flowchart illustrating operations of a watermark processing method according to an exemplary embodiment. Hereinafter, repetitive descriptions regarding FIGS. 1 to 4 will be omitted.

The watermarked image creating unit 100 performs an operation S100 of creating a watermarked image by inserting a predetermined watermark into a virtual wavelet image.

Figure 6:
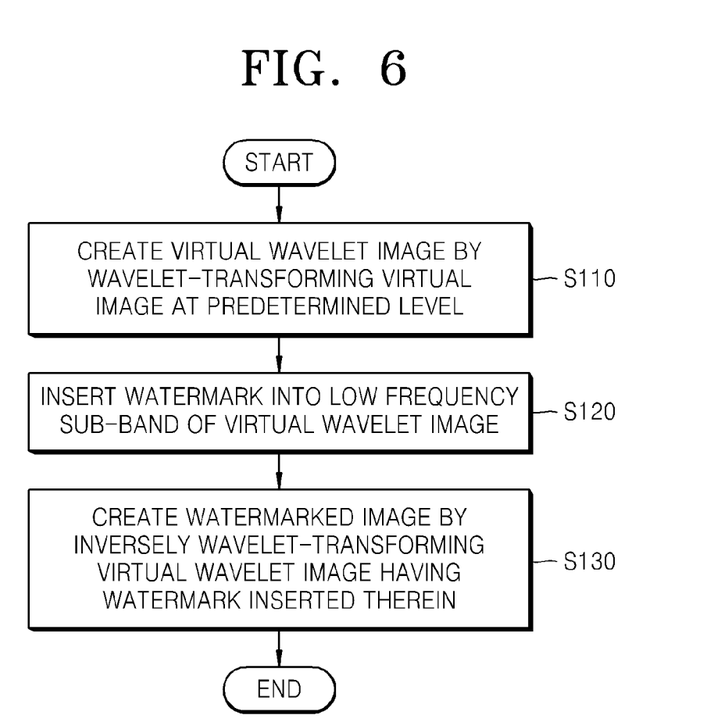
FIG. 6 is a flowchart illustrating a watermarked image creating method in FIG. 5, according to an exemplary embodiment.

FIG. 6 illustrates a method of creating a watermarked image. Referring to FIG. 6, the watermarked image creating unit 100 performs an operation S110 of creating a virtual wavelet image by wavelet-transforming an arbitrary virtual image through predetermined wavelet-transforming levels. The wavelet transforming unit 110 creates sub-images by filtering the virtual image. That is, the wavelet transforming unit 110 applies a low pass filter and a high pass filter to each row of the virtual image, and performs down-sampling to create a low-low (LL) image as a low frequency sub-band sub image, and low-high (LH), high-low (HL), and high-high (HH) images as high frequency sub-band sub images. The watermarked image creating unit 100 performs a K-level wavelet transform, for example, a 2- or 3-level wavelet transform, to create a virtual wavelet image. Here, all of the low frequency sub-band and the high frequency sub-bands have zero coefficient values.

When the virtual wavelet image creation has been completed, the watermarked image creating unit 100 performs an operation S120 of inserting an arbitrary watermark into a low frequency sub-band of the virtual wavelet image. Here, the watermark may be a unique logo (image data) or a data combination (binary data) capable of proving a copyright of a content owner. The reason for inserting a watermark into a low frequency sub-band of a virtual wavelet image is that watermark information in the low frequency sub-band is not damaged during compression of an image.

When the insertion of the arbitrary watermark into the low frequency sub-band of the virtual wavelet image has been completed, the watermarked image creating unit 100 performs an operation S130 of creating a watermarked image by inversely wavelet-transforming the virtual wavelet image having the watermark inserted therein.

When the watermarked image creation has been completed, the synthesizing unit 200 creates a synthesized image in which an input image is combined or synthesized with the watermarked image. Here, the synthesized image indicates a watermarked input image. Here, the input image may be a still image or a moving image. When the input image is a moving image, the synthesizing unit 200 creates the synthesized image by synthesizing each frame of the moving image and the watermarked image. Thereafter, the synthesized image may be compressed and transmitted outside.

Figure 7:
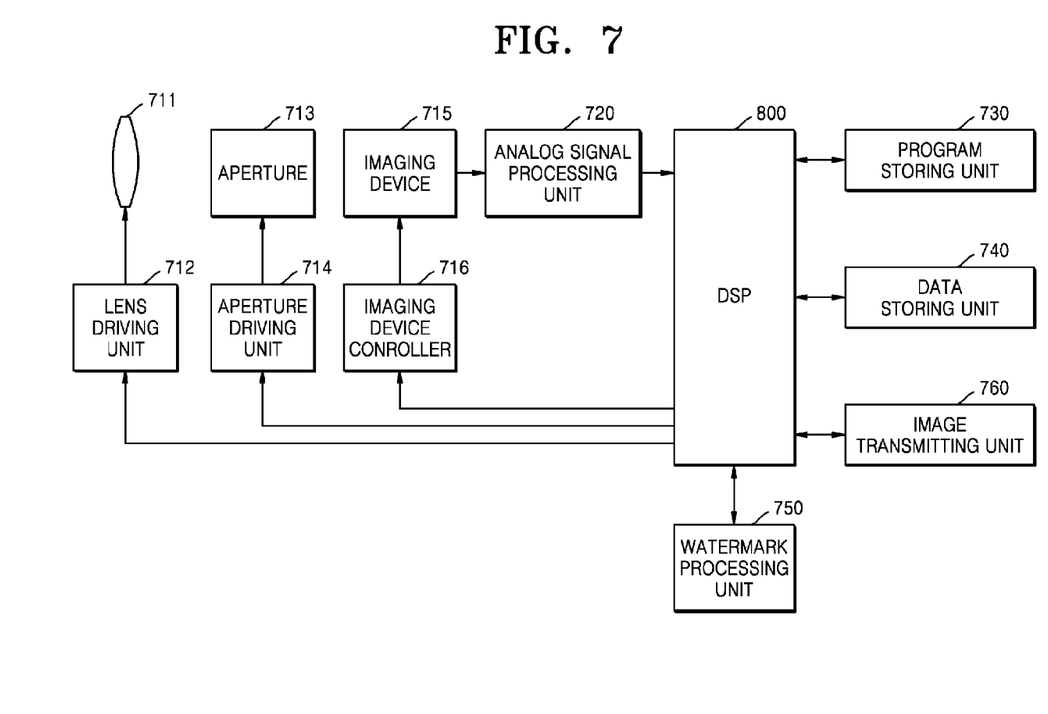
FIG. 7 is a block diagram illustrating a configuration of an image capturing apparatus according to an exemplary embodiment.

FIG. 7 is a block diagram of an image capturing apparatus including a watermark processing device according to an exemplary embodiment.

Referring to FIG. 7, the image capturing apparatus may include a lens unit 711, a lens driving unit 712, an aperture 713, an aperture driving unit 714, an imaging device 715, an imaging device controller 716, an analog signal processing unit 720, a program storing unit 730, a data storing unit 740, a watermark processing unit 750, an image transmitting unit 760, and a digital signal processing (DSP) unit 800. Here, the lens unit 711, the lens driving unit 712, the aperture 713, the aperture driving unit 714, the imaging device 715, the imaging device controller 716, and the analog signal processing unit 720 may be referred to as a capturing unit.

The lens unit 711 includes a zoom lens for controlling an angle of view to be narrow or wide according to a focal length, and a focus lens focused on a subject. The zoom lens and the focus lens may respectively include a single lens, or a group of a plurality of lenses. The aperture 713 adjusts its opening to adjust an amount of an input light beam.

The lens driving unit 712 and the aperture driving unit 714 receive control signals from the DSP unit 800 and respectively drive the lens 711 and the aperture 713. The lens driving unit 712 adjusts a position of the lens unit 711 to adjust a focal length, and performs auto focusing, zoom change, focus change, or the like. The aperture driving unit 714 adjusts opening of the aperture 713, and especially, adjusts an f-number or an aperture value to perform auto-focus, automatic exposure correction, focus change, depth of field adjustment, or the like. Generally, the aperture 713, as a device for adjusting an amount of a light beam, has the same structure as a shutter (not shown), but has a minimum radius of opening despite maximally contracting to minimize its aperture in order for a constant light amount to be passed through.

An optical signal passing through the lens unit 711 reaches a light receiving surface of the imaging device 715 and forms an image of a subject. The imaging device 715 may use a charge-coupled device (CCD), a complementary metal oxide semiconductor image sensor (CIS), or a high speed image sensor, which converts an optical signal to an electrical signal. The imaging device controller 716 may adjust the sensitivity of the imaging device 715. The imaging device controller 716 may control the imaging device 715 according to a control signal automatically generated by an image signal which is input in real time, or a control signal which is manually input by a user's manipulation.

The analog signal processing unit 720 performs a noise reduction process, a gain control, waveform shaping, an analog-to-digital converting process, or the like.

Also, the image capturing apparatus includes a program storage unit 730 for storing an operation system or an application program, and a data storing system 740 for storing image files including an image signal, and various pieces of information necessary to the programs.

The watermark processing unit 750 creates a synthesized image by synthesizing a watermarked image created by inserting a predetermined watermark into a virtual wavelet image, and the captured image.

The watermark processing unit 750 creates a virtual wavelet image by wavelet-transforming an arbitrary virtual image through predetermined wavelet-transforming levels, as shown in FIG. 1, during creation of a watermarked image. Here, a low frequency sub-band and high frequency sub-bands have all zero coefficient values.

When the creation of the virtual wavelet image has been completed, the watermark processing unit 750 inserts an arbitrary watermark into the low frequency sub-band of the virtual wavelet image. Here, the watermark may be a unique logo (image data) or a data combination (binary data) capable of proving a copyright of a content owner. The reason for inserting a watermark into a low frequency sub-band of a virtual wavelet image is that watermark information in the low frequency sub-band is not damaged during compression of an image.

When the insertion of an arbitrary watermark into a low frequency sub-band of a virtual wavelet image has been completed, the watermark processing unit 750 inversely wavelet-transforms the virtual wavelet image having the watermark inserted therein to create a watermarked image.

When the creation of the watermarked image has been completed, the watermark processing unit 750 creates a synthesized image by combining or synthesizing an input image and the watermarked image. Here, the synthesized image indicates a watermarked input image. The input image may be a still image or a moving image. When the input image is a moving image, the watermark processing unit 750 creates synthesized images by synthesizing each frame of the moving image and the watermarked image.

In addition, the image capturing apparatus includes the DSP unit 800 for processing an input image signal and controlling each component according to the image signal or an external input signal.

The DSP unit 800 may reduce noise for the input image data, and perform an image signal processing for improving image quality such as gamma correction, color filter array interpolation, color matrix, color correction, or color enhancement.

Also, the DSP unit 800 may compress image data, created through the image signal process of improving the image quality, to create an image file, or recover the image data from the image file. Image compression format may be reversible or irreversible. As a proper example of the image compression format, a joint photographic experts group (JPEG) format, a JPEG 2000 format or a moving picture experts group (MPEG) format may be possible. In the present embodiment, the DSP unit 800 may compress the synthesized image, namely, the watermarked input image.

The compressed data may be stored in the data storing unit 740 or transmitted outside through the image transmitting unit 760. The image transmitting unit 760 may transmit a captured image or the compressed watermarked input image according to the present embodiment to a receiving stage through a network. Here, when the image capturing apparatus is a surveillance camera, the receiving stage may be a network video recorder or a digital video recorder connected in a wired or wireless manner to the network.

The DSP unit 800 may also functionally perform a sharpening process, a coloring process, a blurring process, edge enhancement, an image interpretation process, an image recognition process, an image effect process or the like. As the image recognition process, face recognition, scene recognition, or the like may be performed. For example, brightness level adjustment, color correction, contrast adjustment, contour enhancement adjustment, a screen division process, creation of a character image, and an image synthesizing process, or the like may be also processed.

In addition, the DSP unit 800 executes a program stored in the program storing unit 730, includes a separate module, generates a control signal for controlling auto focusing, zoom change, focus change, automatic exposure correction, a shutter driving, or the like to provide to the lens driving unit 712, an aperture driving unit 714, and an imaging device controller 716, and entirely controls operations of components included in the image capturing apparatus.

According to the above exemplary embodiments, a processing time and a calculation amount can be reduced by synthesizing a virtual image having a watermark inserted therein and an input image to create a watermarked image.

The embodiments can also be implemented in computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the embodiments can be easily construed by programmers skilled in the art to which the embodiments pertain.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A watermark processing method comprising:
   creating, by a watermarked image creator, a watermarked image by inserting a predetermined watermark into a virtual wavelet image, the virtual wavelet image being obtained by wavelet-transforming a virtual image that is different from an input image; and
   creating, by a synthesizer, a synthesized image by synthesizing the input image and the watermarked image.

2. The watermark processing method according to claim 1, wherein the creating of the watermarked image comprises:
   creating, by a wavelet transformer, the virtual wavelet image by wavelet-transforming the virtual image through at least one time of wavelet transform;
   inserting, by an inserter, the predetermined watermark into a low frequency sub-band image of the virtual wavelet image; and
   inversely wavelet-transforming, by an inverse wavelet transformer, the virtual wavelet image having the predetermined watermark inserted therein to create the watermarked image.

3. The watermark processing method according to claim 2, wherein the virtual wavelet image has at least one zero coefficient value.

4. The watermark processing method according to claim 1, wherein the creating of the synthesized image comprises creating synthesized images by synthesizing each frame of the input image, which is a moving image, and the watermarked image.

5. The watermark processing method according to claim 1, wherein the creating of the watermarked image is performed once with respect to a plurality of input images in response to a change of the predetermined watermark.

6. The watermark processing method according to claim 1, further comprising compressing, by a compressor, the synthesized image to transmit the compressed synthesized image.

7. A non-transitory computer readable medium having a program recorded thereon, which, when executed by a computer, performs the watermarking processing method of claim 1.

8. The non-transitory computer readable medium of claim 7, wherein the creating of the watermarked image comprises:
   creating the virtual wavelet image by wavelet-transforming the virtual image through K levels of wavelet-transform, K being equal to or greater than one;
   inserting the predetermined watermark into a low frequency sub-band image of the virtual wavelet image; and
   inversely wavelet-transforming the virtual wavelet image having the predetermined watermark inserted therein to create the watermarked image.

9. The non-transitory computer readable medium of claim 7, wherein the creating of the synthesized image comprises creating synthesized images by synthesizing each frame of the input image, which is a moving image, and the watermarked image.

10. A watermark processing device comprising:
    a watermarked image creator configured to create a watermarked image by inserting a predetermined watermark into a virtual wavelet image, the virtual wavelet image being obtained by wavelet-transforming a virtual image that is different from an input image; and
    a synthesizer configured to create a synthesized image by synthesizing the input image and the watermarked image.

11. The watermark processing device according to claim 10, wherein the watermarked image creator comprises:
    a wavelet transformer configured to create the virtual wavelet image by wavelet-transforming the virtual image through at least one time of wavelet transform;

an inserter configured to insert the predetermined watermark into a low frequency sub-band image of the virtual wavelet image; and an inverse wavelet transformer configured to inversely wavelet-transform the virtual wavelet image having the predetermined watermark inserted therein to create the watermarked image.

12. The watermark processing device according to claim 11, wherein the virtual wavelet image has at least one zero coefficient value.

13. The watermark processing device according to claim 10, wherein the synthesizer is configured to synthesize each frame of the input image, which is a moving image, and the watermarked image.

14. The watermark processing device according to claim 10, wherein the watermarked image creator is configured to create the watermarked image once with respect to a plurality of input images in response to a change of the predetermined watermark.

15. The watermark processing device according to claim 10, further comprising a compressor configured to compress the synthesized image to transmit the compressed synthesized image.

16. An image capturing apparatus comprising:
a capturer configured to capture an input image of a subject;
a watermark processing device comprising:
 a watermarked image creator configured to create a watermarked image by inserting a predetermined watermark into a virtual wavelet image, the virtual wavelet image being obtained by wavelet-transforming a virtual image, the virtual image being different from the input image; and
 a synthesizer configured to create a synthesized image by synthesizing the input image and the watermarked image;
a compressor configured to compress the synthesized image; and
a transmitter configured to transmit the compressed image.

17. The image capturing apparatus according to claim 16, wherein the watermarked image creator comprises:
a wavelet transformer configured to create the virtual wavelet image by wavelet-transforming the virtual image through at least one time of wavelet transform;
an inserter configured to insert the predetermined watermark into a low frequency sub-band image of the virtual wavelet image; and
an inverse wavelet transformer configured to inversely wavelet-transform the virtual wavelet image having the predetermined watermark inserted therein to create the watermarked image.

18. The image capturing apparatus according to claim 17, wherein the virtual wavelet image has at least one zero coefficient value.

19. The image capturing apparatus according to claim 16, wherein the watermark processor is configured to synthesize each frame of the input image, which is a moving image, captured by the capturer and the watermarked image.

20. The image capturing apparatus according to claim 16, wherein the watermark processor is configured to create the watermarked image once with respect to a plurality of input images in response to a change of the predetermined watermark.

* * * * *